Patented Nov. 21, 1950

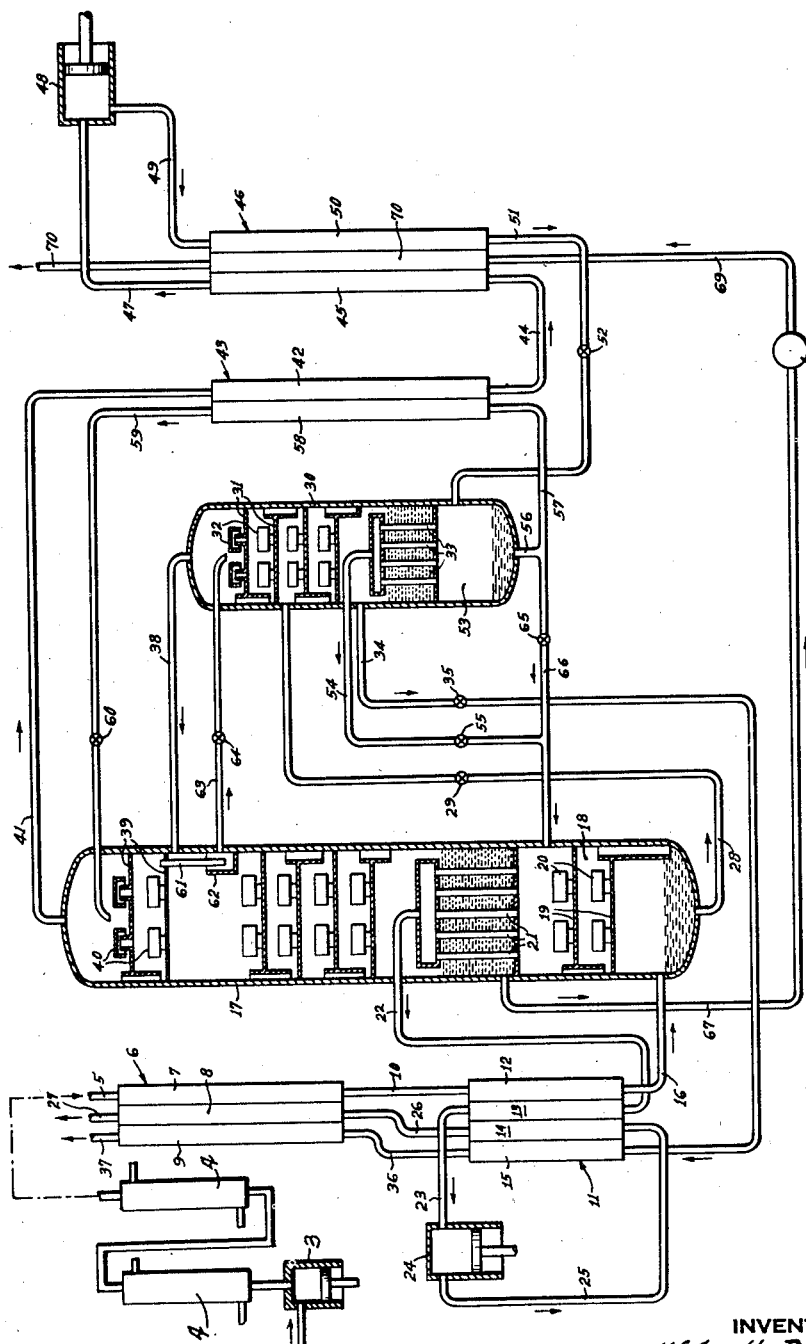

2,530,602

UNITED STATES PATENT OFFICE 2,530,602

RECOVERY OF THE CONSTITUENTS OF GASEOUS MIXTURES

Wolcott Dennis, Darien, Conn., assignor to Air Reduction Company, Incorporated, New York, N. Y., a corporation of New York Application December 12, 1946, Serial No. 715,864

7 Claims. (Cl. 62—175.5)

This invention relates to the separation of the constituents of gaseous mixtures by liquefaction and rectification and particularly to the recovery of valuable constituents of gases from the synthesis of ammonia and similar operations in which, as a result of repeated cycling of mixtures including rare gases of the atmosphere, such gases are concentrated and therefore available in substantial proportions.

Thus, for example, in the gases which leave the ammonia condenser after contact in the synthesis bomb with a catalyst to produce ammonia, there is a mixture consisting principally of hydrogen and nitrogen containing often as much as 20% of argon, some methane, and a small proportion of ammonia. Argon is a valuable product which is present in such gases in much greater proportion than in the atmosphere. The nitrogen and hydrogen are also available for reuse in the ammonia process and elimination of methane from such gases is desirable.

It is the object of the present invention to provide an effective and economically practicable method of treating gaseous mixtures of the type described to recover the constituents, thereby affording a supply of argon in greater quantities than have been available heretofore.

A further object of the invention is the provision of a useful method of removing undesirable constituents from the gases in the ammonia synthesis cycle, thereby improving the synthesis and coincidentally recovering the constituents as valuable byproducts of the operation.

Other objects and advantages of the invention will be apparent as it is better understood by reference to the following specification and the accompanying drawing, which illustrates diagrammatically an apparatus suitable for the practice of the invention. Elements well known in the art have been omitted from the drawing for the purpose of clarity.

Since as indicated the gaseous mixture may contain small amounts of ammonia, it is desirable first to treat the gases for the removal of this constituent. This may be accomplished in any convenient way, as for example contact of the mixture with sulphuric acid. A scrubber (not shown) of any suitable construction may be used for this purpose.

The gaseous mixture, freed from ammonia, is in accordance with the present invention first compressed to a suitable pressure, for example in the neighborhood of 16-18 atmospheres in a compressor 3, and cooled in the usual intercoolers 4. It is then introduced through a pipe 5 to an exchanger 6 which, as diagrammatically shown, includes chambers 7, 8 and 9. It will be understood that any suitable form of exchanger may be employed. After passing through the chamber 7 in heat exchange relation with outgoing products, the gaseous mixture passes through a pipe 10 to an exchanger 11 which is similarly shown as comprising chambers 12, 13, 14 and 15. Here, the gaseous mixture is further cooled by heat exchange with products of the separation and is delivered through a pipe 16 to a column 17 having a compartment 18 at its lower end, which is operated at the initial pressure of the gaseous mixture. The compartment 18 includes trays 19 having the usual caps 20. The gaseous mixture travels upwardly through the trays and into the tubes 21 which are immersed in liquid argon, a product of the separation in the column 17.

Partial liquefaction of the gaseous mixture occurs, the liquid falling back upon the trays 19 and accumulating in the bottom of the compartment 18. This liquid contains the more readily condensible constituents of the gaseous mixture together with some of the nitrogen and hydrogen. The major portion of the nitrogen and hydrogen escapes from the tubes 21 to a pipe 22 and is delivered thereby to the chamber 13 of the exchanger 11. After passing through the chamber, the mixture of nitrogen and hydrogen which is still at the initial pressure is delivered by a pipe 23 to an expansion engine 24 where it is expanded with external work and thereby further cooled. From the expansion engine 24 the mixture of nitrogen and hydrogen is delivered through a pipe 25 to the chamber 14 of the exchanger 11 and passes therethrough to a pipe 26 which delivers it to the chamber 8 of the exchanger 6. Thence the nitrogen and hydrogen mixture escapes through a pipe 27 and may be delivered to any suitable gasometer or other device for further use.

The liquid from the chamber 18 is delivered through a pipe 28 and pressure reducing valve 29 to an auxiliary column 30 having trays 31 and caps 32. The liquid flows downwardly over the trays 31 and vapors arising therefrom are washed with reflux nitrogen supplied as hereinafter described. As a result, the liquid methane accumulates beneath the trays 31 and is vaporized by heat exchange with gases passing through the tubes 33 of a condenser. The vaporized methane escapes through a pipe 34 controlled by a valve 35 and is delivered to the compartment 15 of the exchanger 11. Thence it travels through a pipe 36 to the compartment 9 of the exchanger 6 and is withdrawn through a pipe 37. It may be stored in a suitable container for subsequent use.

The effluent from the column 30 consists of argon and nitrogen with small amounts of hydrogen and escapes through a pipe 38 to an intermediate level of the column 17 which is provided with trays 39 and caps 40. The effluent passes upwardly through the upper trays of the column 17 in contact with reflux nitrogen liquid supplied as hereinafter described. As a result of rectification in the column 17, liquid argon accumulates around the tubes 21 as hereinbefore noted.

The effluent from the column 17 consists principally of nitrogen with small amounts of hydrogen and argon. It is withdrawn through a pipe 41 and passes through chamber 42 of an exchanger 43, thence through a pipe 44 to chamber 45 of an exchanger 46 and through a pipe 47 to a compressor 48. Here the effluent is compressed from the pressure of the columns 17 and 30, that is approximately 1 atmosphere, to a pressure of approximately 20 atmospheres or more, and is delivered through a pipe 49 to the chamber 50 of the exchanger 46, thence through a pipe 51 and valve 52 to a compartment 53 at the bottom of the column 30. The effluent passes upwardly through the tubes 33, and the nitrogen and any argon are condensed, leaving hydrogen which is withdrawn through pipe 54 and valve 55 to the compartment 78 at the bottom of the column 17. Thence it passes through the tubes 21 and joins the nitrogen and hydrogen mixture which is eliminated in the tubes.

The liquid nitrogen accumulating in the chamber 53 is withdrawn through a pipe 56 and delivered through a pipe 57 to the compartment 58 of the exchanger 43. Thence it passes through a pipe 59 and valve 60 to the top of the column 17, affording the reflux nitrogen liquid required for the maintenance of the separation in that column. The liquid nitrogen overflows through a tube 61 into a collector 62. A portion of the liquid nitrogen overflows from the collector 62 into the lower trays of the column 17. The remainder passes through a pipe 63 and valve 64 into the top of the column 30, affording the liquid nitrogen effluent required for the separation therein. If desired, a portion of the liquid nitrogen from the pipe 56 can be delivered through a valve 65 and pipe 66 into the compartment 18 at the bottom of the column 17 to afford reflux liquid on the trays 19.

The liquid argon which is one of the principal products of the separation is delivered from the column 17 through a pipe 67 and a liquid pump 68 to a pipe 69 which is connected to a compartment 70 of the exchanger 46. Thus, the nitrogen circulating through the exchanger 46 is cooled by the liquid argon which is vaporized and escapes through a pipe 70 to any suitable receptacle in which it may be stored. Argon in the vapor phase may be withdrawn, if desired, by connecting the pipe 67 above the liquid level, in which case the pump 68 may be omitted.

As the result of the separation, nitrogen and hydrogen are available for re-use. Methane is eliminated from the mixture and may be used or discarded, and the argon which is concentrated in the gaseous mixture is recovered as a valuable production of the operation.

Various changes may be made in the details of procedure and in the apparatus as described without departing from the invention or sacrificing the advantages thereof.

I claim:

1. The method of recovering the constituents of gaseous mixtures including principally nitrogen and hydrogen with a substantial proportion of argon which comprises compressing and thereafter cooling the gaseous mixture by heat exchange with separated nitrogen and hydrogen before and after expansion thereof, subjecting the mixture to partial condensation by heat exchange with the liquid argon product of the operation and thereby separating the major part of the nitrogen and hydrogen in the gaseous phase from a liquid enriched in constituents less volatile than nitrogen including argon, subjecting the enriched liquid to rectification to separate argon with the residue of nitrogen and hydrogen as a gaseous effluent and rectifying the gaseous effluent to recover the argon in the liquid phase.

2. The method of recovering the constituents of gaseous mixtures including principally nitrogen and hydrogen with a substantial proportion of argon which comprises compressing and thereafter cooling the gaseous mixture, subjecting the mixture to partial condensation by heat exchange with the liquid argon product of the operation and thereby separating the major part of the nitrogen and hydrogen in the gaseous phase from a liquid enriched in constituents less volatile than nitrogen including argon, subjecting the enriched liquid to rectification to separate argon with the residue of nitrogen and hydrogen as a gaseous effluent, rectifying the gaseous effluent to recover the argon in the liquid phase and compressing and thereafter liquefying the gaseous effluent from the second rectification to afford reflux liquid for both rectifications.

3. The method of recovering the constituents of gaseous mixtures including principally nitrogen and hydrogen with a substantial proportion of argon and some methane which comprises compressing and thereafter cooling the gaseous mixture, subjecting the mixture to partial condensation by heat exchange with the liquid argon product of the operation and thereby separating the major part of the nitrogen and hydrogen in the gaseous phase from a liquid enriched in constituents less volatile than nitrogen including argon, utilizing the nitrogen and hydrogen before and after expansion to cool the incoming gaseous mixture, subjecting the liquid enriched in constituents less volatile than nitrogen to rectification to separate liquid methade from an effluent consisting of the remainder of the constituents in the gaseous phase and rectifying the gaseous effluent to recover the argon in the liquid phase.

4. The method of recovering the constituents of gaseous mixtures including principally nitrogen and hydrogen with a substantial proportion of argon and some methane which comprises compressing and thereafter cooling the gaseous mixture, subjecting the mixture to partial condensation by heat exchange with the liquid argon product of the operation and thereby separating the major part of the nitrogen and hydrogen in the gaseous phase from a liquid enriched in constituents less volatile than nitrogen including argon, subjecting the liquid enriched in constituents less volatile than nitrogen to rectification to separate liquid methane from an effluent consisting of the remainder of the constituents in the gaseous phase, rectifying the gaseous effluent to recover the argon in the liquid phase and compressing and thereafter liquefying the gaseous effluent from the second rectification to afford reflux liquid for both rectifications.

5. The method of recovering the constituents of gaseous mixtures including principally nitrogen and hydrogen with a substantial proportion of argon and some methane which comprises compressing and thereafter cooling the gaseous mixture, subjecting the mixture to partial condensation by heat exchange with the liquid argon product of the operation and thereby separating the major part of the nitrogen and hydrogen in the gaseous phase from a liquid enriched in constituents less volatile than nitrogen including argon subjecting the liquid enriched in constituents less volatile than nitrogen to rectification to collect liquid methane from an effluent consisting of the remainder of the constituents in the gaseous phase, rectifying the gaseous effluent to recover the argon in the liquid phase and compressing and thereafter liquefying the gaseous effluent from the second rectification by heat exchange with the liquid methane to afford reflux liquid for both rectifications.

6. The method of recovering the constituents of gaseous mixtures including principally nitrogen and hydrogen with a substantial proportion of argon and some methane which comprises compressing and thereafter cooling the gaseous mixture, subjecting the mixture to partial condensation by heat exchange with the liquid argon product of the operation and thereby separating the major part of the nitrogen and hydrogen in the gaseous phase from a liquid enriched in constituents less volatile than nitrogen including argon, subjecting the liquid enriched in constituents less volatile than nitrogen to rectification to separate liquid methane from an effluent consisting of the remainder of the constituents in the gaseous phase, rectifying the gaseous effluent to recover the argon in the liquid phase and compressing and thereafter liquefying the gaseous effluent from the second rectification by heat exchange successively with the liquid argon product and the liquid methane to afford reflux liquid for both rectifications.

7. The method of recovering the constituents of gaseous mixtures including principally nitrogen and hydrogen with substantial proportions of argon and some methane which comprises compressing and cooling the mixture, subjecting the mixture to partial condensation by heat exchange with the liquid argon product of the operation and thereby separating the major portion of the nitrogen and hydrogen in the gaseous phase, and then subjecting the remainder of the mixture including argon to successive rectifications to separate the methane and argon respectively, withdrawing and compressing the effluent from the final rectification and subjecting it to partial condensation to provide liquid nitrogen reflux for the successive rectifications.

WOLCOTT DENNIS.

REFERENCES CITED

The following references are of record in the file of this patent:

UNITED STATES PATENTS

| Number | Name | Date |
|---|---|---|
| 1,498,766 | Van Nuys | June 24, 1924 |
| 2,009,084 | Gomonet | July 23, 1935 |
| 2,040,107 | Schlitt | May 12, 1936 |
| 2,040,108 | Schlitt | May 12, 1936 |
| 2,040,116 | Wilkinson et al. | May 12, 1936 |
| 2,089,543 | De Baufre | Aug. 10, 1937 |
| 2,180,435 | Schlitt | Nov. 21, 1939 |
| 2,240,925 | De Baufre | May 6, 1941 |
| 2,316,056 | De Baufre | Apr. 6, 1943 |
| 2,337,474 | Kornemann | Dec. 21, 1943 |